United States Patent
Wildeshaus et al.

(10) Patent No.: US 6,658,959 B2
(45) Date of Patent: Dec. 9, 2003

(54) SHIFTING DEVICE FOR A SPEED CHANGE GEARBOX, WITH A DAMPING COMPONENT AND A SHIFT PATH LIMIT

(75) Inventors: Walter Wildeshaus, Herzogenaurach (DE); Boris Landa, Bubenreuth (DE); Andreas Grieshammer, Nürnberg (DE); Wolfgang Steinberger, Herzogenaurach (DE); Manfred Winkler, Aurachtal (DE); Rainer Schübel, Ansbach (DE)

(73) Assignee: INA Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/782,333

(22) Filed: Feb. 13, 2001

(65) Prior Publication Data

US 2001/0017063 A1 Aug. 30, 2001

(30) Foreign Application Priority Data

Feb. 15, 2000 (DE) .......................... 100 06 721

(51) Int. Cl.$^7$ .............................................. F16H 63/38
(52) U.S. Cl. ................. 74/473.27; 74/473.28; 74/527
(58) Field of Search .................... 74/473.27, 473.28, 74/527, FOR 102

(56) References Cited

U.S. PATENT DOCUMENTS

| | | | | |
|---|---|---|---|---|
| 2,529,741 A | * | 11/1950 | Roberts | 74/473.33 |
| 3,513,717 A | * | 5/1970 | Lickey et al. | 74/473.26 |
| 3,581,594 A | * | 6/1971 | Longshore | 74/473.26 |
| 4,338,828 A | * | 7/1982 | Ruhlman | 74/473.27 |
| 4,537,088 A | * | 8/1985 | Kubota | 74/473.21 |
| 4,539,859 A | * | 9/1985 | Arai et al. | 74/473.27 |
| 4,941,368 A | * | 7/1990 | De Boer et al. | 74/473.36 |
| 5,979,262 A | * | 11/1999 | Doelling et al. | 74/473.21 |

FOREIGN PATENT DOCUMENTS

| | | |
|---|---|---|
| DE | 4110555 A1 | 10/1992 |
| DE | 4442120 A1 | 5/1996 |
| DE | 19832786 A1 | 2/2000 |
| JP | 58-132820 | * 8/1983 |
| JP | 2-150569 | * 6/1990 |
| JP | 4-34262 | * 2/1992 |
| JP | 6-161584 | * 6/1994 |
| WO | 9003523 | 4/1990 |
| WO | WO 97/01455 | * 1/1997 |

* cited by examiner

Primary Examiner—William C Joyce
(74) Attorney, Agent, or Firm—Volpe and Koenig, P.C.

(57) ABSTRACT

A shifting device (1) for a speed change gearbox with a transmission component that can be shifted in a longitudinal direction and/or about its longitudinal axis in a pivoting manner, which for transmitting the shifting movements is equipped with a damping component (8), which is constructed from at least one ramp-shaped profile (9a), and at least one roller component (12) which is pre-loaded against ramp-shaped profile (9a) by means of spring action.

6 Claims, 3 Drawing Sheets

SHIFTING DEVICE FOR A SPEED CHANGE GEARBOX, WITH A DAMPING COMPONENT AND A SHIFT PATH LIMIT

BACKGROUND

The invention involves a shifting device on a gearbox, with a transmission component for transmitting the shifting movements associated with the changing of gears, where this transmission component can either be pushed in a lengthwise direction, or can be pivoted around its axis, which axis is situated at the midpoint in the path of longitudinal movement, as, for example, a selector shaft, and at least one stoppage point, at which point the transmission component at least is moveable by means of pushing in a lengthwise fashion, or through being pivoted around its longitudinal centerline into at least one stop position in the speed change gearbox, and—in at least one stop position— travels against the limit stop.

If components installed in such a way as to be susceptible to longitudinal movement, and/or rotary movement, as well as swivel movement are restricted by means of mechanical limit stops, and if assemblies in their longitudinal or swing movement are similarly restricted, then the result is not only high levels of stress and strain on the construction components, but also noises are produced when the moved component make contact with the limit stop. The selector shafts in the speed change gearboxes of motor vehicles, for example, are components of this sort. The selector shafts are moved in a longitudinal direction for elective shifting movements, or pivoted and transferred around a pivot axis by means of one or several transmission components, for example shifting movements on a selector shaft, a selector fork or on a gear shift lever. The pathway of the selector shaft must be restricted for the elective and/or shifting movements. The selector shafts are moved into a stop position in accordance with the transmitting of an elective movement by means of the shifting movement, in which the chosen path is located. Also, a selected position can finish at the end of a channel in a stop position. The shifting and elective pathway of selector shafts in the stop positions is often restricted by means of limit stops. The selector shafts or selector rails can attach in a secure position in the housing or to a shifting gate in that way the restriction contour of a casing, or of a shift gate serves as a limit stop as well as a restriction on the pathway. The pathway of a shaft in an axial direction and/or in a pivot direction can be definitely fixed by means of a pin that travels along in the shifting gate and that pushes into the end positions at the contour of the shifting gate profile. The sequence of the shifting processes frequently produces a sudden braking of the transmission component in the shifting device at the limit stops. Vibrations are thus generated and along with consequent sounds.

In the past, various types of damping elements were utilized for the purpose of avoiding aforementioned undesirable sounds in shifting devices. For example, WO 90/03523 describes a selector shaft with a damping arrangement, in which air is used as the specific means of achieving the desired damping effect. A gear shift lever is set in motion by means of the selector shaft, while the selector shaft itself is shifted in an axial direction into different end positions by a piston that is loaded by means of compressed air. On reaching the end positions, the piston plunges into a counter pressure chamber area. At that point, the air that is impinged upon by the axially shifted pistons escapes slowly through a throttling opening. In this way, mechanical knocking is prevented. The antecedently mentioned selector shaft, and consequently also the gear shift levers are halted in the end positions by means of stop elements. The stop elements arrest the selector shaft in the end positions, by engaging with a spring-loaded ball or a pin into an indentation in the selector shaft. The hollows are restricted in a longitudinal direction, by means of flanks that are formed in a ramp-like fashion. When the selector shaft is axially shifted out of one of the end positions into another end position, the ball at one of the flanks rises, moves along a track, and travels down another flank into another indentation. Devices that are damped by means of compressed air are relatively expensive to produce, and they are also costly due to the multiplicity of individual parts that are used, and require as a precondition of this the presence of a supply source of compressed air, as well as the existence of additional components that work together with this compressed air. Damping components of this kind are put in place for the most part only on the speed change gearboxes of utility vehicles that are activated or supported by compressed air. In particular, in hand shifted transmissions in personal motor vehicles, therefore mechanical limit stops cannot be abandoned. Between the limit stop and the part to be stopped a damping material such as a rubber or plastic is used. The rubber, as well as the plastic prevents, or in any case decreases, the mechanically induced vibrations that lead to the sounds.

Shifting speeds using a selector shaft that is susceptible to being shifted in a longitudinal fashion as well as in a pivoting manner normally takes place in two steps. In the first step, for purposes of choosing, an axial shifting of the selector shaft into an end position is envisioned. In this way, a shift finger that is connected to the selector shaft, or some similar component thus connected, is brought into its end position. In the second step, it is pivotably shifted from this end position by pivoting of the selector shaft into the speed, by means of the shift finger and other components. Conversely, the first step can also be carried out by means of a pivoting movement, and in the second step the shifting of a speed can be achieved by a longitudinal movement. When, in the first step, the selector shaft is brought axially into one of the end positions, it frequently knocks against a limit stop axially in the process. Under certain circumstances, a damping component, of rubber or plastic, is installed in place between the selector shaft for reasons that are well known. When the selector shaft is shifted during the second step of the switching process, the selector shaft rubs at the damping component. Especially when the damping component is manufactured from a rubber material, the selector shaft must be operated at an increased energy level, due the friction forces exerted. Frequently, the operator of the device senses this effect on the basis of uneven, and consequently unacceptably inconsistent shifting forces.

With selector shafts, in which the restriction contour of a crank serves simultaneously as a limit stop, and as a means of restricting the pathway of the selector shaft, no damping mechanisms are pivoted as components. Here frequently one simply accepts the mechanical noise connected with the knocking.

A selector shaft which defines the genus of this type is described in DE 198 05 924 A1. The selector shaft bears a catch sheath, as well as a shift finger, and is mounted for axial movement. On the catch sheath, a catch profile as well as a shifting gate are formed. A stop element that is secured in position relative to the longitudinal centerline works into the catch profile. By means of the catch profile and the stop element, the selector shaft is held either in a neutral position or in one of several end positions. The stop element engages with indentations. The catch profile is formed in such a way that three elongated grooves proceed in longitudinal direction on the exterior surface of the catch sheath, that are adjoined to one another circumferentially. In its longitudinal course in each direction, the base of the longitudinally extended groove rises away from an indentation to a relatively flat plane, in either a ramp-like fashion or in curved formation. Upon the application of force to the selector shaft—which causes longitudinal movements in one or another direction—the vertically spring-loaded ball which acts on the longitudinal centerline of the selector shaft, rises up out of the indentation at the groove base. If this application of force is discontinued, then the force exerted by the vertical spring becomes operative, the ball rolls in the direction of the indentation in the groove, and the selector shaft is shifted back into the neutral position. The longitudinal groove that is circumferentially positioned between the two outer grooves exhibits cross flanks, that rise relatively steeply from the groove base to the rim of the groove. From there, the cross flanks proceed through a curve into the relatively steeply descending cross flanks of the neighboring longitudinal groove. With shifting movements on the selector shaft, that is to say, pivoting movements are made, the ball of the stop element overcomes the curve until the ball clicks into position in the neighboring longitudinal groove. The selector shaft is then halted in a shifting position of a speed. As a function of differing degrees of elevation in the flanks or the base groove, different levels of force are produced for activation of the shifting or swiveling of the selector shaft.

The necessary restriction of the mode of choosing and the mode of shifting of the genus-forming selector shaft results from the profile of the shifting gate. A pin is introduced into the shifting gate that is formed on the catch sheath. The shifting gate includes a groove that extends in a longitudinal direction relative to the selector shaft, with which several grooves proceeding in a cross-wise direction merge. The blind end points of the grooves that are restricted by means of the wall of the catch sheath, are the limit stops, which the undamped selector shaft, in its end positions, comes into contact with, by means of the pin.

The demand for modem motor vehicles has increased. Heightened awareness regarding the environment, as well as increased claims to greater comfort on the part of customers, demands that all sources of noise be eliminated, to the extent that this is feasible.

SUMMARY

The object of the invention, therefore, is to create a shifting device, whose longitudinally shifting and/or pivoting transmission components produce no disturbing noises, during the course of elective shifting movements, when these impact upon the limit stops.

This task is accomplished by providing a shifting device that includes at least one damping component, which is formed from at least one ramp-shaped profile and at least one pre-loaded roller component that applies a spring action against the ramp-shaped profile, and that the ramp-shaped profile, at least along a line on which the roller component travels upon movements of the transmission component against the limit stop, is restricted by means of a contour line that proceeds in an increase mode in the direction of movement. The ramp-shaped profile is, for example, located on the transmission component. The roller component that is pre-loaded against the ramp-shaped profile—securely installed within the housing—is then picked up and guided along. A spring-action component, for example a compression spring, pre-loads the roller component against the ramp-shaped profile in a way that the roller component can roll on the ramp-shaped profile. Also, for a such application, it is advantageous to utilize the familiar stop pin that is spring-loaded, and that is guided within a sheath securely installed within the housing which, as described at the outset, also serves to bring to a halt a selector shaft both in its neutral position, and in its shifting positions. In this case, the roller component is formed by means of the ball that is usually located in the pin. It also is conceivable that the roller component might be positioned at the transmission component, and the ramp-shaped profile might have its position securely fixed within the housing. The roller component rolls pre-loaded on the ramp-shaped profile, when the transmission component is moved in the direction of the limit stop. The cross-section of the ramp-shaped profile along the line, on which the roller component rolls with this movement, is characterized by an increase in the direction in which the roller component rolls. By "contour line that proceeds in an increase mode" it is to be understood not only as a progressively rising course of the contour line, but also a course of the contour line that proceeds in a linear fashion and in a descending manner. With an increasing resistance path of the roller component on the ramp-shaped profile, it becomes necessary—due to the increase—to apply increasing amounts of force on the transmission component. The transmission component is, therefore, braked. The forces that are necessary for the moving of the transmission component become higher the more the transmission profile comes into proximity with its end position, and consequently with the limit stop. Through the formation of the increase, and the curvature of the contour line of the ramp-shaped profile, the desired forces can be determined, from relatively hard to comfortably soft. Preferred designs of the invention foresee that the contour line rises progressively, or first proceeds ramp-like manner as well as runs out on its end in a curve that extends outwardly. At that point, the contour line can be designed in such a way, for example with a certain, very steep curvature, that the forces for moving the transmission component onto the limit stop become so high that that they are equivalent to a mechanical limit stop. In this case, no metallic elements strike against one another. There is no production of vibration. Thus, noise is avoided. The finally determined contour line, that proceeds in a ramp-like manner, and that extends out on its end in an outwardly directed curvature, is formed with the curvature being defined by a radius. The radius is either equal to or greater than the radius of the roller component.

In accordance the invention, with a damping unit it is also possible to form a low-noise shifting device, in which the profile of a shifting gate form the limit stops. The invention can be simultaneously employed for the application, in which components that are arranged for longitudinal, rotary, and swiveling movement, especially components in shifting devices, must be restricted in their pathway by means of limit stops.

The ramp contour is coordinated generally in a way such that either the transmission component, in a very subdued form, comes into contact with the mechanical limit stop, or that a mechanical limit stop is not absolutely necessary, due to the increasing forces. If an additional mechanical limit stop can be eliminated with the formation of the contour line of the ramp-shaped profile for the transmission component, it is advantageous to equip the running out of the contour line with the radius mentioned above, which is equal to or greater than roll radius of the roller component. A conjoining of the roller component and the contour line is thus brought about, in which favorable compression relationships can be formed between the roller body and the course of the limit contour.

The ramp-shaped profile can be produced by stamping or mechanical working of a desired material that has suitable qualities; however, steel is the material of choice for purposes of production. Among the processes that can be employed for its production are chip-cutting processes, EDR ("electrical discharge machining"), but also non-cutting processes, as for example stamping or pressing. A preferred design mode for the invention envisions the formation of the ramp-shaped profile in a sheet metal part that is formed by means of a deep drawing process. That sheet metal part is produced individually, or is integrated in a complex sheet metal part, such as, for example, a catch sheath. That sheet metal part can be welded to the transmission component, as for example to a selector shaft. As individual parts, manufactured ramp-shaped profiles can even be tempered—in a coordinated fashion—independently of the other components of the shifting device.

Another embodiment of the invention provides a damping component formed of a first ramp-shaped profile, a second ramp-shaped profile, and a roller component pre-loaded against the ramp-shaped profile by means of spring action. In that event, the first ramp-shaped profile is restricted by means of a contour line that proceeds in an increase mode in the direction of rolling, at least in a longitudinal direction along a first line, on which line the roller component rolls against a first limit stop, on the occasion of longitudinal movements of the transmission component. The second ramp-shaped profile is restricted by means of a contour line proceeding in an increase mode in the direction of rolling, at least in a pivoting direction along a second line, on which the roller component rolls at the time of pivoting movements of the transmission component against a second limit stop. Conversely, the first stopping profile can be restricted in a pivot direction by means of one of the previously described contour lines, and the second ramp-shaped profile can include a contour line rising in longitudinal direction. Such a formation of the damping component is especially suitable for the application of selector shafts in a longitudinal mode, as well as in pivoting mode. It is conceivable to integrate the rising contours into the catch sheath, or a shifting sheath arranged separately on the selector shaft. In that case, the first ramp-shaped profile provides for an increase in the motive force at the transmission component, and consequently also for a moderating effect on the striking action that takes place in a longitudinal direction at the point of the limit stop. The second ramp-shaped profile guarantees that a damping effect will be produced, when the transmission component comes into contact with a limit stop during an instance of pivoting. The first ramp-shaped profile, and the second ramp-shaped profile are formed preferably on a common profile component. The roller component rests on this common profile component in a base position, and is then moved, as a function of whether the transmission component is longitudinally shifted, or shifted in rotary fashion on the first or the second ramp-shaped profile. The course of the contour line, on which the roller component travels at the time of the movement of the transmission component up to the limit stop, is formed once again with a rising course, in accordance with the previously mentioned rules of formation.

Especially in the event that a stop pin is employed to function as holder for the roller component, but also with the utilization of a damping component with a first and a second ramp-shaped profile, it is preferable to make use of a ball as the roller component.

Finally, it is foreseen with one design mode for the invention that the ramp-shaped profile should include the limit stop. This limit stop, on the other hand, is preferably to be created by means of the formation of the contour line, for example, through the aforementioned nesting, or as special excess pressure back-up protection. With an excess pressure back-up protection, for example a solid mechanical limit stop at the end of the contour line, it is guaranteed that a faulty service through the production of very high force which would be conducive to missing the end position, as well as to crossing the path way restriction is avoided.

BRIEF DESCRIPTION OF THE DRAWINGS

The invention is explained on the basis of the preferred embodiments. In the drawings.

DETAILED DESCRIPTION OF THE PREFERRED EMBODIMENTS

Figure 1:
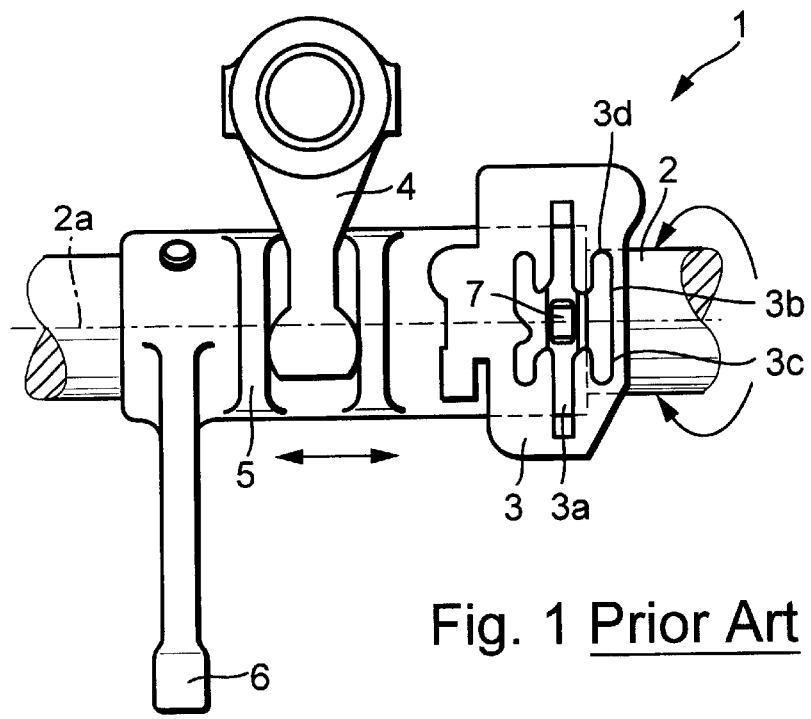
FIG. 1 is a schematic representation of a selector shaft that can be shifted in longitudinal and in swiveling fashion with a shifting gate, in accordance with the current state of the technology.

In FIG. 1 a shifting device is represented as "1," in accordance with the current state of the art. This representation of the shifting device (1) is taken from the product overview of the company INA Walzlager Schaeffler, oHG entitled, "Application Examples—Products for the Shifting in Motor Vehicles," June 1992 Edition, page 17. The shifting device (1) includes a selector shaft (2), a shifting gate (3) and a lever (4) for the operation of a shift lever arm that is not further represented here. A guide (5) for the lever (4) is formed on the selector shaft (2), also as a shift finger (6) and a pin (7). The pin (7) engages with the shifting gate (3a) of the shift gate guide (3). The selector shaft (2) is positioned so as to be movable in a longitudinal mode, in both directions in a case that is not represented here. In addition, the selector shaft (2) is arranged for pivoting movement about its longitudinal centerline (2a).

The shifting device (1) is represented in FIG. 1 in the neutral position of the selector shaft (2). The guide of the shifting gate (3) is securely installed within the housing. The selector shaft (2) can generally be moved in a longitudinal direction, until the pin (7) bumps into the limit stop (3b) of the shifting gate (3a). The process of selection is completed. By pivoting the selector shaft (2), the shifting takes place in the one or in the other direction, therefore in the direction either of a limit stop (3c), or a limit stop (3d). On reaching one of these limit stops (3c, 3d), the shifting process is completed, and the transmission component, in this case the selector shaft (2), is in an end position. In this fashion, the chosen speed is put in place.

Figure 2:
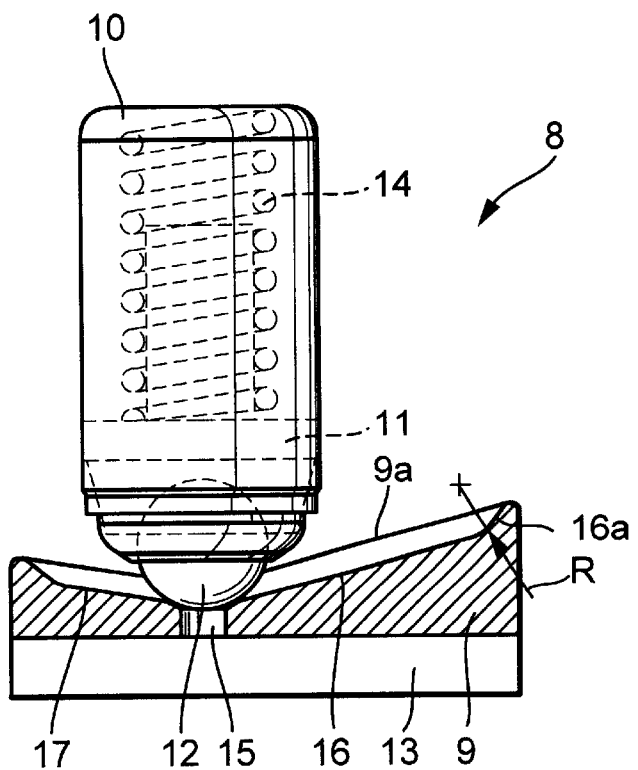
FIG. 2 is a view of damping component in accordance with the invention.

FIG. 2 shows an embodiment for a damping component (8) in accordance with the invention. The damping component (8) is formed of a sheet metal part (9), with a first ramp-shaped profile (9a), and a stop element (10). The stop element (10) includes pin (11) and a roller element (12) that is shaped like a ball. The pin (11), and with it the roller element (12), is pre-loaded by means of a spring (14) against the first ramp-shaped profile (9a). A seat (13) is formed on the first ramp-shaped profile for secure positioning on a transmission component, not represented.

The damping component is shown in FIG. 2 in an exit position, that is to say, in the neutral position of the transmission component (not represented). The roller element (12) engages with an indentation (15) at that time. The contour lines that restrict the cross-section of the first ramp-shaped profile (9a) along the line, on which the roller component (12) rolls at the time of the movements of the transmission component against a limit stop, are designated as (16) as well as (17). The contour lines (16, 17), rise outwardly from the indentation (15). In this way, the contour lines (16, 17) proceed initially in a ramp-like manner, that is to say, in the form of an inclined plane, and continue in their further course over into a curvature (16a). The curvature (16a) is formed in such a way as to be progressively rising, and is characterized by forming the radius R.

Figure 3:
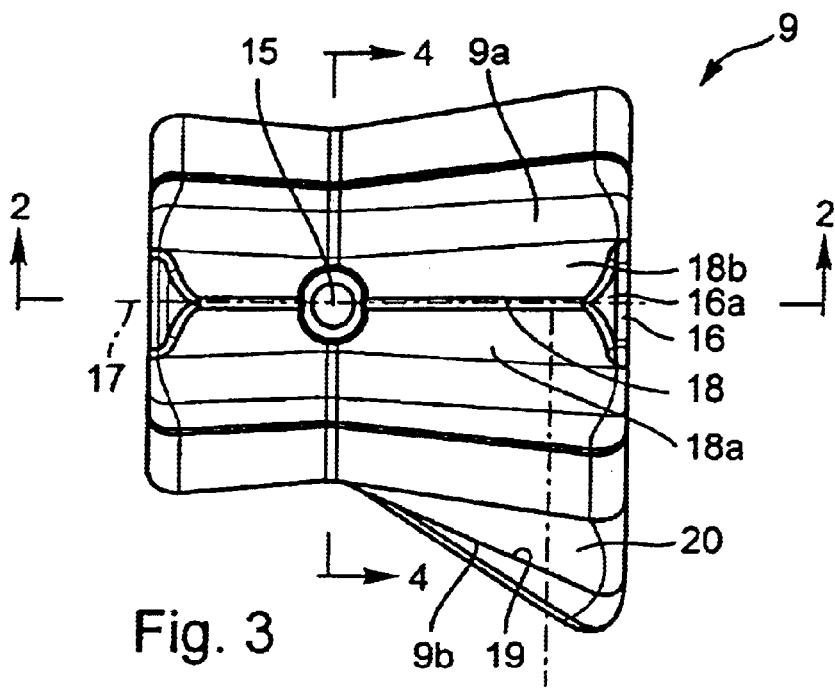
FIG. 3 is a top view of the ramp-shaped profile of the damping component shown in FIG. 2.
Figure 4:
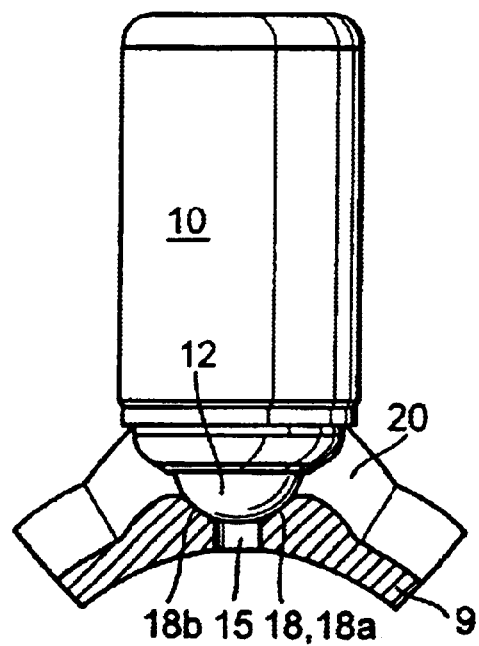
FIG. 4 is a view of the damping component in accordance with FIG. 2, with a partial section cut of the ramp-shaped profile.

FIG. 3 is a top view of the sheet metal part (9) with the ramp-shaped profile (9a). The contour lines (16, 17) are indicated by broken lines. It is evident from FIG. 4 that the roller component (12) is guided in a longitudinal groove (18) in a longitudinal direction. When the transmission component is turned, the roller element (12) rises at the flank (18a), or (18b), and is moved out of the longitudinal groove (18).

Figure 5:
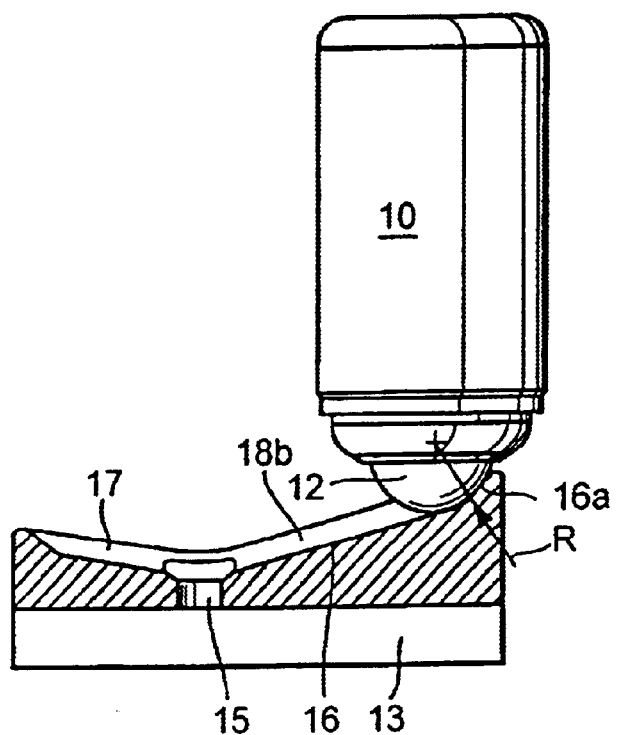
FIG. 5 is view of the damping component in accordance with FIG. 2, with the end position of its roller component on the ramp-shaped profile, when shifting in a longitudinal direction.

FIG. 5 shows the preferred embodiment of the damping component (8) as set forth in FIG. 2, where the roller element (12) is represented in its end position on the ramp-shaped profile (9a). The roller element (12) nests into the radius R of the curvature (16a). In this position, the transmission component is located in an end position. In this end position, the transmission component either contacts a separate limit stop not represented, or it contacts the limit stop by means of the roller element (12) that nests into the curvature (16a). In the latter case, the curvature (16a) of the ramp-shaped profile (9a) is simultaneously the limit stop for this end position of the transmission component.

Figure 6:
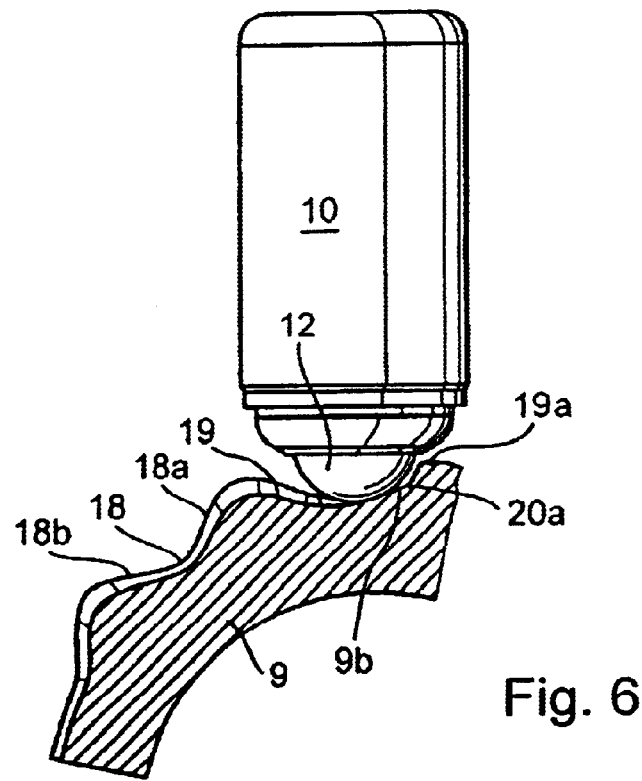
FIG. 6 is a view of the damping component, in accordance with FIG. 2, with an end position of its roller component after a swiveling movement.

FIG. 6 shows the damping component (8) in another end position of the roller element (12). This end position is occupied by the roller element (12), when it travels over the flank (18a) of the longitudinal groove (18) into an indentation (20) from the end position, in accordance with FIG. 5 along the contour line displayed in FIG. 3 and designated by "19." The flank (18a) of the indentation (20) is cut through the contour line (19) of the second ramp-shaped profile (9b). The roller element (12) rolls over the flank (18a) when of the sheet metal part (9) initially pivots out of the longitudinal groove (18), into the indentation (20), in the contour line (19). If this sheet metal part (9) is rotated further, the transmission component moves up against a second limit stop (19a) The roller element (12) rises at the flank (20a), and follows the contour line (19) further where it progressively rises until the transmission component has reached its end position.

REFERENCE NUMBERS 1 shifting device
2 selector shaft
2a longitudinal centerline
3 shifting gate guide
3a shifting gate
3b limit stop
3c limit stop
3d limit stop
4 lever
5 guide
6 shift finger
7 pin
8 damping component
9 sheet metal part
9a first ramp-shaped profile
9b second ramp-shaped profile
10 stop element
11 pin
12 roller element
13 seat
14 spring
15 hollow
16 contour line
16a curvature
17 contour line
18 longitudinal groove
18a flank
18b flank
19 contour line
20 indentation

What is claimed is:

1. Shifting device (1) of a manual speed change gearbox, comprising a transmission component that can be shifted longitudinally and/or about a longitudinal centerline in a pivoting fashion to transmit shifting movements, and at least one limit stop (16a, 19a), the transmission component is movable by at least one of longitudinal shifting or pivoting about the longitudinal centerline (17) into at least one end position on the speed change gearbox, and includes the at least one limit stop (16a, 19a) in the at least one end position, the device including at least one damping arrangement (8), having a first ramp-shaped profile (9a) and a second ramp shaped profile (9b), and at least one roller component (12) pre-loaded by spring action against the first and second ramp-shaped profiles (9a, 9b), the first ramp-shaped profile (9a) is restricted in at least a longitudinal direction along a first line on which the roller component (12) rolls upon longitudinal movement of the transmission component toward the first limit stop (16a), through a first contour line (16) extending in a rising mode in the direction in which the roller component (12) moves, and the second ramp-shaped profile (9b) is at least restricted into the pivot direction along a second line on which the roller component (12) rolls upon pivoting movements of the transmission component toward a second limit stop (19a), through a contour line (19) proceeding in a rising mode in a direction in which the roller component (12) rolls during pivoting movements of the transmission component, each of the limit stops of the shifting device is formed at an end portion of each of the ramp-shaped profiles.

2. Shifting device in accordance with claim 1, wherein the contour line (19) rises progressively.

3. Shifting device in accordance with claim 1, wherein the contour line (16) extends in a ramp-like fashion toward an end which terminates in an outwardly directed curvature (16a).

4. Shifting device in accordance with claim 3, wherein the curvature (16a) is defined by a radius, which is equal to or greater than a radius of the roller component (12).

5. Shifting device in accordance with claim 1, wherein the ramp-shaped profile (9*a*, 9*b*) is formed from a sheet metal part (9) through a stamping process.

6. Shifting device in accordance with claim 1, wherein the roller component (12) is a ball.

* * * * *